Nov. 22, 1966 R. S. JONES 3,286,779
SKIRT DEPTH AND AIR-CUSHION PLANFORM AREA DIMENSIONAL
RELATIONSHIP FOR GROUND EFFECT VEHICLE STABILITY
Filed Jan. 14, 1963

INVENTOR
RICHARD STANTON JONES

BY Larson and Taylor

ATTORNEYS

United States Patent Office 3,286,779
Patented Nov. 22, 1966

3,286,779
SKIRT DEPTH AND AIR-CUSHION PLANFORM AREA DIMENSIONAL RELATIONSHIP FOR GROUND EFFECT VEHICLE STABILITY
Richard Stanton Jones, Cowes, Isle of Wight, England, assignor to Westland Aircraft Limited, Yeovil, Somerset, England
Filed Jan. 14, 1963, Ser. No. 251,341
Claims priority, application Great Britain, Jan. 26, 1962, 3,151/62, 3,152/62
1 Claim. (Cl. 180—7)

This invention relates to ground effect vehicles of the peripheral jet type, that is, those which in one phase of their operation are wholly or partially supported by a pressurised air or gas cushion generated between the base platform structure of the vehicle and the surface over which it is operating.

The invention is particularly concerned with the provision of flexible jet skirting depending from the rigid base platform structure of a peripheral jet type machine.

In the interests of power economy, it is desirable to operate such vehicles as close to the surface as possible. The vehicle must, however, be able to achieve a clearance height such that the risks of wave obstacle impact upon the rigid base platform structure are avoided as far as possible, particularly as the platform structures are light and often constitute buoyancy chambers enabling such vehicles to alight on water.

The provision of flexible jet skirting in the case of peripheral jet type vehicles increases, for a given output, the clearance height the rigid base platform structure can obtain, particularly when the peripheral jets discharge the pressurised air or gas below the base platform at the bottom of the flexible skirting.

The present invention aims at establishing the distance the skirting extends below the base platform of the vehicle to ensure satisfactory stability when operating over cross seas and also provides a relationship between this skirt depth and the dimension of the planform area of the pressurised air or gas cushion for satisfactory operation of the vehicle at high speeds, say 70 knots, for example.

The invention consists in a ground effect vehicle of the kind set forth, comprising a base platform including pressurised gas or air cushion generating arrangements and a skirting extending below the base platform in a manner as to retard the escape of the pressurised gas or air cushion thereby increasing the clearance height of the vehicle during operation, the vehicle being characterised in that the depth of the skirting extends below the base platform is not greater than one-fifth times the minimum main dimension, usually the beam axis dimension, of the planform area of the cushion.

Further objects and advantages of the invention will become readily apparent from the following detailed description with reference to the accompanying drawings in which.

Figure 1:
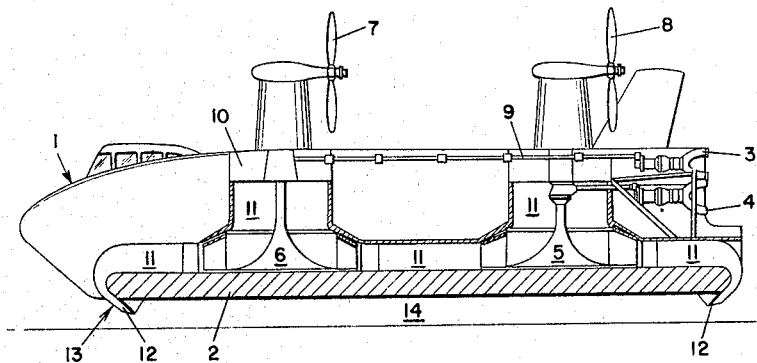
FIGURE 1 is a longitudinal cross section through a ground effect vehicle of the kind set forth.
Figure 2:
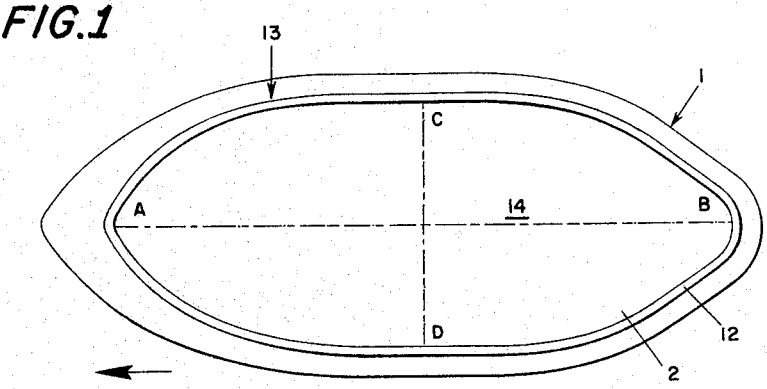
FIGURE 2 is an inverted plan of the vehicle showing the gas cushion planform area.

In carrying the invention into effect according to one convenient form with reference to FIGURES 1 and 2, a ground effect vehicle generally indicated at 1 is provided having a base platform 2 which includes buoyancy tanks for operation of the vehicle in water. Engines 3 and 4 arranged in pairs provide power for operating lift fans 5 and 6 and also power for operating propulsion propellers 7 and 8. Fans 5 and 6 cause air to be drawn through air intakes 9 and 10, from whence it is forced under pressure through rigid ducting 11 to issue from annular nozzles 12 disposed within flexible skirting 13. The skirting 13, which extends the base platform 2 of the vehicle 1 in a manner as to extend the rigid ducting 11, may be applied around substantially the whole of the periphery of the base platform 2 or alternatively may be applied at least along the sides of the base platform 2 between the bow and stern of the vehicle. The air, issuing from the nozzles 12, forms a fluid curtain which generates and maintains a ground effect cushion of pressurised air which, in operation of the vehicle, exists between the base platform 2 and the surface over which the vehicle is to travel.

According to the present invention the vehicle 1 is constructed so that the dimension of the fore and aft axis A–B of the planform area 14 of the cushion is longer than the beam axis C–D dimension thereof. Generally speaking, as in this case, these dimensions will correspond to the main dimensions of the base platform 2.

According to one feature of the invention flexible skirting 13 is secured to, and adapted to extend downwardly below, the base platform 2 by a distance not greater than one fifth the minimum main dimension of the planform area of the cushion, which is usually, as in this case, the beam axis dimension C–D.

Figure 3:
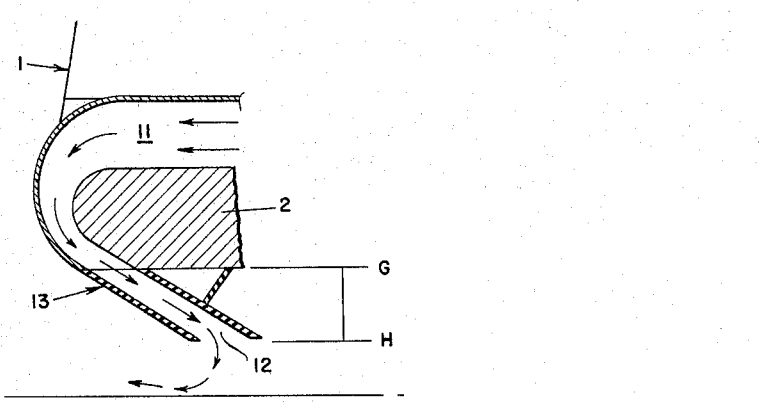
FIGURE 3 is an enlarged sectional detail of the jet orifice in the flexible skirting.

The nozzles 12 for generating the ground effect cushion are located around the bottom of the edge of the flexible skirting 13. By maintaining the length G–H (FIGURE 3) the flexible jet skirting extends below the base platform structure 2 by not more than one-fifth and preferably between one-sixth and one-seventh the minimum main dimension i.e., the beam C–D of the planform area 14 of the ground effect cushion, very satisfactory stability over cross seas is achieved when the vehicle is "sitting down."

The term "sitting down" may be defined as the transitionary period between hovering and alighting on the water, when the engines are shut down.

Beam is referred to since in most practical vehicles the fore-and-aft axis dimension, as hereinbefore described, is longer than the beam axis dimension so that the cushion area substantially conforms to the same configuration. If the skirting 13 is longer than the stated amount the cross seas stability becomes marginal. If it is shorter then the sea condition operating limitations are increased, in that, in general, satisfactory operation is achieved over wave amplitude maximum which is equal to or a little smaller than the length of the flexible skirting 13.

According to a further feature of the invention for satisfactory operation of the vehicle 1 at high speeds, say 70 knots for example, the dimensions of the fore and aft axis A–B of the planform area 14 of the ground effect cushion area chosen to be at least ten times the distance G–H (FIGURE 3) the skirting 13 extends below the base platform 2. In this way, unacceptable "tripping" of the skirting 13 is avoided when travelling at high speed when waves of amplitude approaching the distance the skirting 13 extends below the base platform 2 are encountered.

It will be realised that the foregoing discloses important features, particularly in relation to high speed ground effect vehicles, since the skirting in any case should be constructed between 1 to 1.25 times the amplitude maximum of the waves over which it is desired that the vehicle shall operate satisfactorily. Thus, had this invention remained unconceived, any vehicle produced to operate over given sea conditions, would, when the wave amplitude approached the design performance limit, have to operate at a reduced efficiency.

I claim as my invention:
A ground effect vehicle comprising a base platform, means for generating a supply of pressurized gas for use in forming a pressurized gas supporting cushion under said base platform, and a skirting attached to and extending below said base platform in a manner to retard the escape of the pressurized gas supporting cushion and thereby increase the clearance height of the vehicle during operation, said skirting being formed from a flexible material so as to yield and pass over encountered obstacles and return to its original extended position, said skirting incorporating downwardly directed orifices at the lower edge thereof and passage means for connecting said orifices to said supply of pressurized gas whereby pressurized gas is directed from said orifices to form a fluid curtain to create and maintain the pressurized gas supporting cushion, the dimensions of said skirting being so related to the planform dimensions of said supporting air cushion that said skirting extends below said base platform by a distance between one-sixth and one-seventh of the beam axis dimension of the planform area of the cushion and that the fore and aft axis of the planform area of the cushion is at least ten times as long as the depth of the skirting below the base platform.

References Cited by the Examiner

UNITED STATES PATENTS

| | | | |
|---|---|---|---|
| 3,139,947 | 7/1964 | Beardsley | 180—7 |
| 3,150,731 | 9/1964 | Franklin et al. | 180—7 |
| 3,180,443 | 4/1965 | Jones | 180—7 |

FOREIGN PATENTS

| | | |
|---|---|---|
| 1,238,499 | 7/1960 | France. |
| 1,251,967 | 12/1960 | France. |
| 232,436 | 2/1961 | Australia. |

A. HARRY LEVY, *Primary Examiner.*

FERGUS S. MIDDLETON, *Examiner.*

M. A. KLEIN, *Assistant Examiner.*